United States Patent
Jeong et al.

(10) Patent No.: US 8,600,333 B2
(45) Date of Patent: Dec. 3, 2013

(54) APPARATUS FOR MIXING FREQUENCY

(75) Inventors: Jin-Cheol Jeong, Daejeon (KR); In-Bok Yom, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 174 days.

(21) Appl. No.: 13/231,181

(22) Filed: Sep. 13, 2011

(65) Prior Publication Data

US 2012/0064824 A1   Mar. 15, 2012

(30) Foreign Application Priority Data

Sep. 15, 2010   (KR) .................. 10-2010-0090535
Aug. 30, 2011   (KR) .................. 10-2011-0087221

(51) Int. Cl.
*H04B 1/26* (2006.01)
(52) U.S. Cl.
USPC ......... 455/323; 455/313; 455/189.1; 455/326
(58) Field of Classification Search
USPC ......... 455/313, 130, 315, 323, 316, 317, 318, 455/326, 255, 256, 258, 86, 333, 293, 322, 455/189.1, 190.1
See application file for complete search history.

(56) References Cited

U.S. PATENT DOCUMENTS

2003/0186669 A1* 10/2003 Yamawaki et al. ........... 455/323
2005/0233723 A1* 10/2005 Gomez et al. ................. 455/323
2006/0160518 A1* 7/2006 Seendripu et al. ............ 455/323

OTHER PUBLICATIONS

Chin-Fu Li et al., "A 60dB Harmonic Mixing Reduction Mixer for Wideband Applications", IEEE MTT-S International Proceedings, pp. 559-562, Jun. 2008.

* cited by examiner

*Primary Examiner* — John J Lee
(74) *Attorney, Agent, or Firm* — Rabin & Berdo, P.C.

(57) ABSTRACT

A frequency mixing apparatus includes a local oscillator, a signal distributor, a first frequency mixer and a second frequency mixer and a combiner. The signal distributor divides a signal generated from the local oscillator into two signals having a phase difference and outputs the two signals. The first frequency mixer has a first input port through which one of the two signals outputted through the signal distributor is inputted and a second input port connected to an RF signal. The a second frequency mixer has a first input port through which one of the two signals outputted through the signal distributor and a second input port is connected to a termination signal. The combiner combines signals respectively outputted from the first and second frequency mixers.

7 Claims, 2 Drawing Sheets

APPARATUS FOR MIXING FREQUENCY

CROSS-REFERENCES TO RELATED APPLICATIONS

The present application claims priority of Korean Patent Application Nos. 10-2010-0090535 and 10-2011-0087221, filed on Sep. 15, 2010, and Aug. 30, 2011, respectively, which are incorporated herein by reference in their entirety.

BACKGROUND OF THE INVENTION

1. Field of the Invention

Exemplary embodiments of the present invention relate to a frequency mixing apparatus; and, more particularly, to a frequency mixing apparatus applied to a frequency down-converter for a Ka-band satellite repeater, etc., which can effectively remove a second harmonic of a local oscillator from an output signal.

2. Description of Related Art

Recently, requirements of Ka-band communication satellites have been gradually increased so as to satisfy mobility and digitalization of communication rapidly spread. Signals used in Ka-band communication satellites have a radio frequency (RF) band of 30 GHz and an intermediate frequency (IF) band of 20 GHz.

Therefore, it is necessary to convert the frequency band of a signal from 30 GHz to 20 GHz. To this end, a local oscillator (LO) generating a signal with a frequency near 10 GHz is required. However, the signal generated from the LO passes through a frequency mixer, and the frequency mixer generates not only an IF signal of which frequency is converted but also an undesired second harmonic. The second harmonic has a value very close to 20 GHz.

Generally, a harmonic outputted from a mixer is removed using a filter, but it is very difficult to remove the harmonic very close to the IF band using the filter. Practically, a Ka-band communication repeater uses an RF band of 29.6 to 30 GHz and an IF band of 19.8 to 20.2 GHz.

Therefore, an LO signal of 9.8 GHz is required, and the mixer outputs not only an IF signal but also a second LO harmonic of 19.6 GHz which is just different by 200 MHz from the IF band.

The doubly balanced structure of a mixer is widely used as a general method for removing a second harmonic. However, although the mixer is implemented into the doubly balance structure, there is a limitation in removing the second harmonic.

In implementation of a practical frequency converter, several order filters are used together with a doubly balanced mixer. However, the several order filters increase the size of the frequency converter and also increase loss of an RF signal.

A representative technology for removing an LO harmonic has been disclosed in a paper published by Chin-Fu Li, Po-Chiun Huang, "A 60 dB harmonic mixing reduction mixer for wideband applications," IEEE MTT-S International Proceedings, pp. 559-562, June 2008. In the paper, there is proposed a method for reducing a harmonic by adding two transistors to the structure of a Gilbert-type mixer and performing a rectification operation between the two transistors.

However, since a Gilbert-type analog circuit is used in the method, the circuit operates at only a low frequency of 1 GHz or less. Therefore, the circuit cannot be used at a high frequency. In addition, the two additional transistors increase the entire power consumption of the circuit.

U.S. Patent Publication No. US2006/0160518, entitled "Harmonic Reject Receiver Architecture and Mixer" has been disclosed in the art. In the patent, LO signals having different phases are applied to LO inputs of two mixers, respectively. Each of the LO signals having different phases is implemented by shifting an LO output using a phase shifter.

RF signals having the same phase are applied to RF inputs of the two mixers, respectively. Thus, IF (RF-LO) signals having different phases and LO harmonics having different phases are outputted as two IF outputs, respectively. Before the IF outputs, two mixers having the same type of the aforementioned two mixers are connected. The different RF signals become in-phase and the different IF signals become out-of-phase through phase shifters used for LO inputs of the added mixers, thereby removing the LO harmonics.

However, four mixers and two phase shifters are necessary for the aforementioned structure, and an LO is additionally provided. Therefore, the structure of the circuit is complicated, and the implementation cost of the circuit is increased.

SUMMARY OF THE INVENTION

An embodiment of the present invention is directed to a frequency mixing apparatus applied to a frequency down-converter for a Ka-band satellite repeater, etc., which can effectively remove a second harmonic of a local oscillator from an output signal.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a frequency mixing apparatus includes a local oscillator, a signal distributor configured to divide a signal generated from the local oscillator into two signals having a phase difference and output the two signals, a first frequency mixer configured to have a first input port through which one of the two signals outputted through the signal distributor is inputted and a second input port connected to an RF signal, a second frequency mixer configured to have a first input port through which one of the two signals outputted through the signal distributor and a second input port is connected to a termination signal, and a combiner configured to combine signals respectively outputted from the first and second frequency mixers.

The signal distributor may be a 90-degree hybrid for dividing the signal generated from the local oscillator into two signals having a phase difference of 90 degrees and outputting the two signals.

Second harmonics respectively outputted from the first and second frequency mixers may have a phase difference of 180 degrees.

The second input port of the second frequency mixer may be connected to a 50Ω termination signal.

The first and second frequency mixers may be mixers having the same characteristic.

The signal combiner may remove the second harmonics respectively outputted from the first and second frequency mixers by offsetting the second harmonics from each other in a signal combining process.

The signal combiner may be a combiner having a zero-degree phase difference.

The signal inputted through each of the first input ports of the first and second frequency mixers may be a signal having a frequency band of 9.8 GHz, and the RF signal inputted through the second input port of the first frequency mixer may be a signal having a frequency band of 29.6 to 30 GHz.

DESCRIPTION OF SPECIFIC EMBODIMENTS

Figure 1:
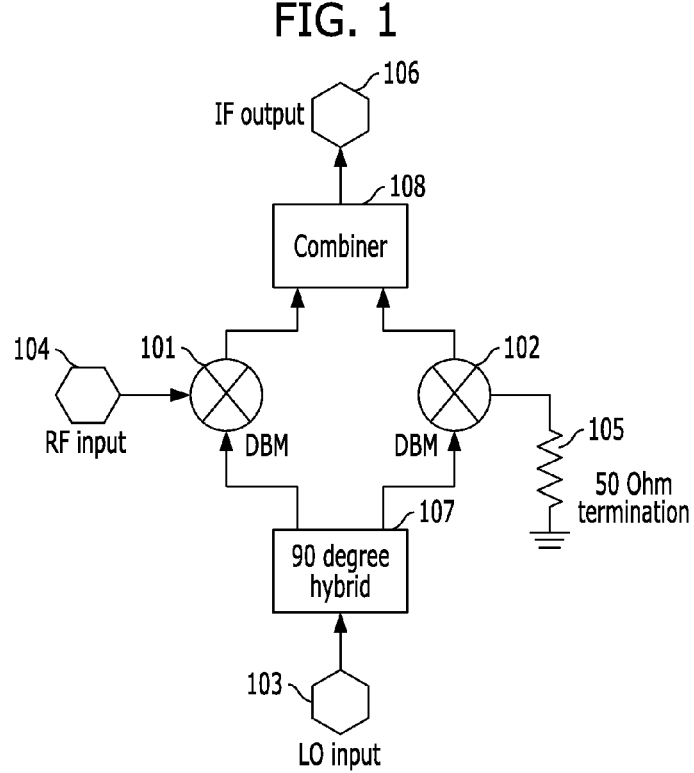
FIG. 1 is a configuration diagram of a frequency mixing apparatus in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be understood that when an element is referred to as being "coupled" or "connected" to another element, it can be directly coupled or connected to the other element or intervening elements may also be present. It will be further understood that the terms "comprises" and/or "comprising," when used in this specification, specify the presence of stated elements, and/or components, but do not preclude the presence or addition of one or more other elements, components, and/or groups thereof.

FIG. 1 is a configuration diagram of a frequency mixing apparatus in accordance with an embodiment of the present invention.

Referring to FIG. 1, the frequency mixing apparatus according to this embodiment includes first and second frequency mixers 101 and 102, a hybrid (signal distributor) 107 and a combiner 108. That is, the frequency mixing apparatus according to this embodiment has a structure in which a dummy mixer having the same characteristic as a doubly balanced mixer (DBM) generally used is added to the DMB.

The hybrid 107 is connected to a local oscillator (LO) port to which an LO signal is applied from an LO, so that the LO signal is divided and outputted as two signals having a phase difference through the hybrid 107. In this embodiment, the hybrid 107 may be a 90-degree hybrid for dividing and outputting an input signal as two signals having a 90-degree phase difference.

The two LO signals with a phase difference, outputted through the hybrid 107 are connected first ports of the first and second frequency mixers 101 and 102, respectively. In this case, a typical RF signal is connected to a second port 104 of the first frequency mixer 101, and a second port 105 of the second frequency mixer 102 is terminated.

The two LO signal, the typical RF signal and IF output signals of the first and second frequency mixers 101 and 102, generated by an input of a termination signal, are combined through the combiner 108 and then outputted through an IF port 106. Here, the combiner 108 may be a combiner for generating signals with no phase difference, i.e., a zero-degree phase difference.

In this embodiment, second harmonics among harmonics generated through the first and second frequency mixers 101 and 102 under the same condition have phases opposite (a phase difference of 180 degrees) to each other, and outputted as outputs of the two frequency mixers 101 and 102, respectively. Thus, the second harmonic is offset by the second harmonic having the opposite phase in the process of combining the harmonics using the combiner 108.

In other words, frequency signals applied to a practical Ka-band communication satellite will be described as an example. In terms of two outputs of the 90-degree hybrid 107, the phase difference between output signals is degrees in 1×LO harmonics of 9.8 GHz supplied through inputs of the 90-degree hybrid 107, but the phase difference between output signals is 180 degrees in 2×LO harmonics of 19.6 GHz supplied through inputs of the 90-degree hybrid 107. Thus, the phases of the 2×LO harmonics among harmonics generated through the frequency mixers under the same condition are opposite (a phase difference of 180 degrees) to each other, and the 2×LO harmonics are outputted as outputs of the first and second frequency mixers 101 and 102, respectively. Accordingly, the 2×LO harmonic is offset by the 2×LO harmonic having the opposite phase in the process of combining the harmonics using the combiner 108. In terms of an RF signal, the RF signal is not supplied from the second frequency mixer 102, and hence the combiner 108 is not influenced by the second frequency mixer 102.

Figure 2:
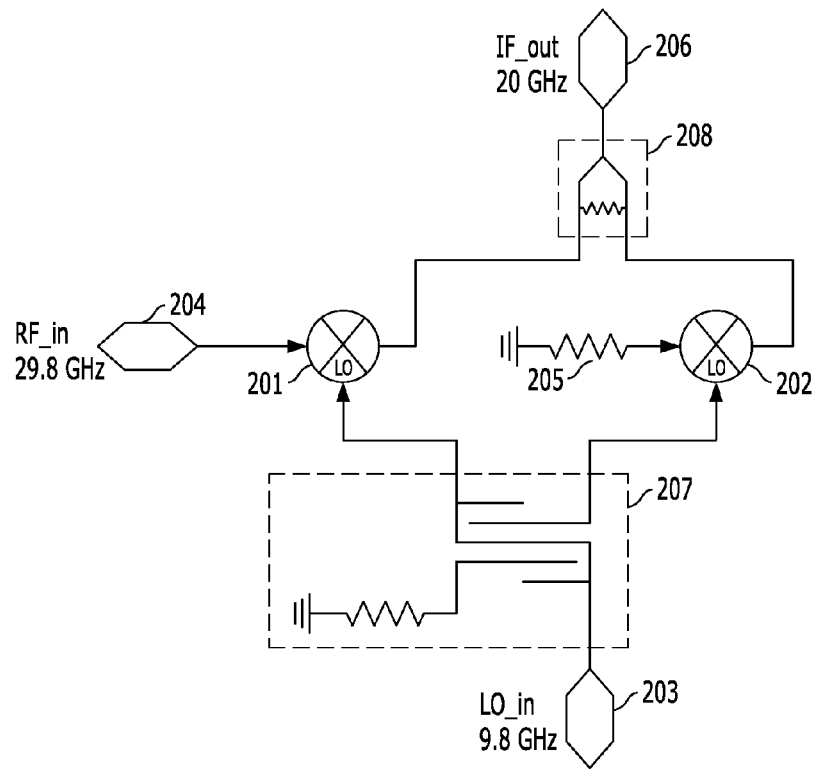
FIG. 2 is a circuit diagram illustrating an embodiment of the frequency mixing apparatus of FIG. 1.

FIG. 2 is a circuit diagram illustrating an embodiment of the frequency mixing apparatus of FIG. 1.

Referring to FIG. 2, an LO signal generated from an LO is inputted through an LO port 203 of a 90-degree hybrid 207 and divided into two signals having a phase difference. Then, the divided two signals are applied to first and second frequency mixers 201 and 202, respectively. The first and second frequency mixers 201 and 202 receive LO signals having a phase difference and RF signals having a phase difference as inputs, and transfer mixed signals of the LO signals and the RF signals to a combiner 208. Then, a final IF signal is generated and outputted through the combiner 208.

Here, the first and second frequency mixers 201 and 202 may have the structure of the DBM. An RF signal of about 29.8 GHz may be connected to a second port 204 of the first frequency mixer 201, and a 50Ω termination signal may be connected to a second port 205 of the second frequency mixer 202. The second frequency mixer 202 is 50 Ω-terminated so as to equalize conditions of the first and second frequency mixers 201 and 202 because the balance between the two frequency mixers 201 and 202 is very important. This is because the second port (RF port) of the frequency mixer generally has an impedance of 50Ω.

In this embodiment, a Lange coupler having excellent band characteristic is used as the 90-degree hybrid 207, and a Wilkinson combiner having excellent band characteristic is also used as the combiner 208.

Figure 3:
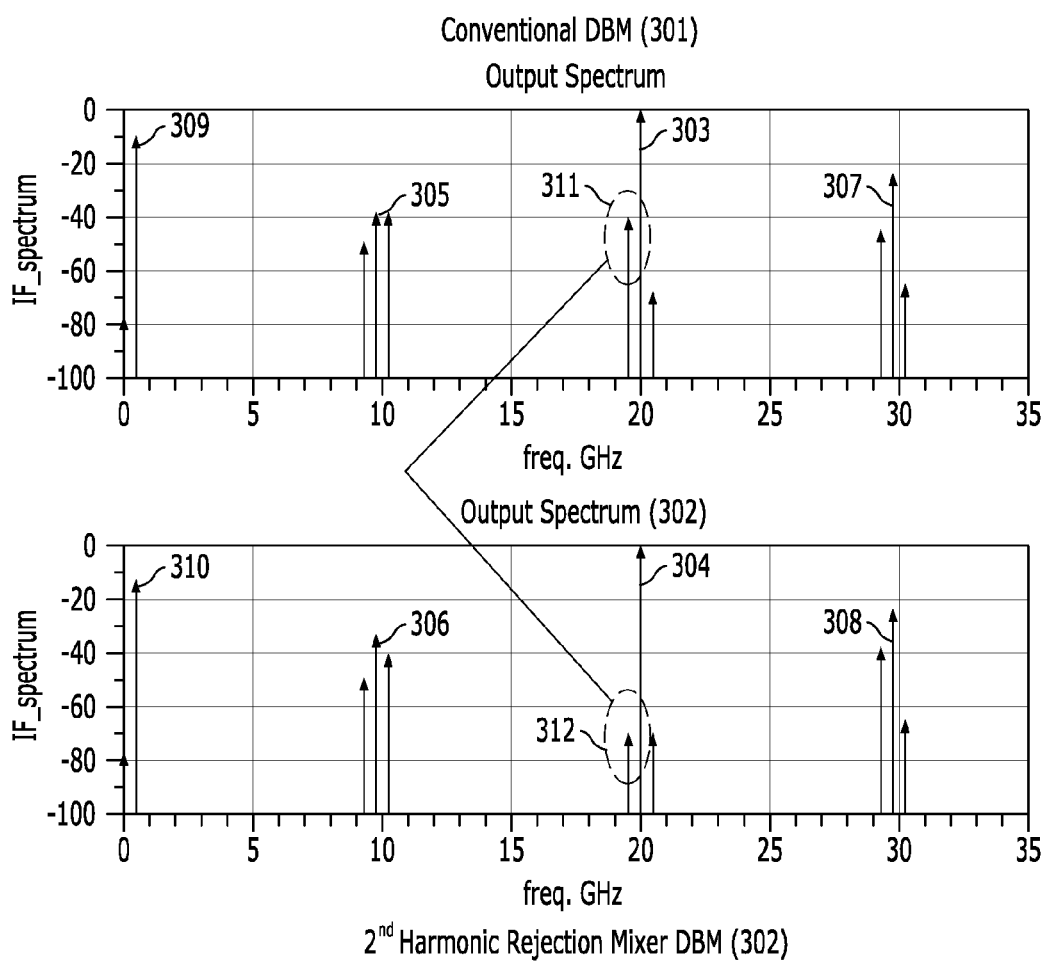
FIG. 3 illustrates output spectra of frequencies generated at an IF port after simulating the circuit diagram of FIG. 2.

FIG. 3 illustrates output spectra of frequencies generated at an IF port after simulating the circuit diagram of FIG. 2.

That is, FIG. 3 is a result diagram illustrating output spectra of frequencies such as IF signals and LO harmonics generated at the IF port after simulating the circuit diagram of FIG. 2 using a computer. In order to verify the present invention, results obtained by performing simulation using a practical DBM, a Lange coupler as the 90-degree hybrid and a Wilkinson combiner as the combiner are illustrated in FIG. 3.

Among the two graphs, the upper graph 301 illustrates a simulation result obtained when applying a typical frequency mixing apparatus constituting one DBM, and the lower graph 302 illustrates a simulation result obtained when applying the frequency mixing apparatus according to this embodiment.

In the two graphs 301 and 302, only signals 303 and 304 of 20 GHz among these spectra are desired IF signals (RF-LO), and the other signals are signals to be removed.

In the two graphs 301 and 302, Leakages (1×LO) 305 and 306 of LO signals have amplitudes almost similar to each other, and leakages 307 and 308 of RF signals have amplitudes almost similar to each other. RF-2×LO signals 309 and 310 generated by RF signals and second LO signals also have amplitudes almost similar to each other.

However, it can be seen that the 2×LO signals 311 and 312 that are second harmonics of LO signals has a phase difference of about 30 dB or more between the two graphs. Thus, it can be seen that the improvement factor of the second harmonic removal of the frequency mixing apparatus according to this embodiment is improved by 30 dB or more as compared with the typical frequency mixing apparatus having only the one DBM.

Since the other frequency spectra except the second harmonics 311 and 312 have frequencies far distant from the IF signal 303 and 304, the other frequency spectra can be easily removed using a filter or the like. However, since the second harmonics 311 and 312 have frequencies very close to the IF band, it is difficult to remove the second harmonics by simply using the filter.

Thus, the frequency mixing apparatus according to the present invention uses a mixer for second harmonic removal, thereby solving such a problem.

In accordance with the exemplary embodiments of the present invention, the improvement factor of the second harmonic removal of the frequency mixing apparatus according to the present invention is considerably improved as compared with the typical frequency mixing apparatus having only the one DBM.

Further, the frequency mixing apparatus capable of effectively removing second harmonics is configured by simply adding a dummy mixer, a hybrid and a combiner to the frequency mixing apparatus, so that its implementation is possible using a monolithic microwave integrated circuit (MMIC).

While the present invention has been described with respect to the specific embodiments, it will be apparent to those skilled in the art that various changes and modifications may be made without departing from the spirit and scope of the invention as defined in the following claims.

What is claimed is:

1. A frequency mixing apparatus, comprising:
a local oscillator;
a signal distributor configured to divide a signal generated from the local oscillator into two signals having a phase difference and output the two signals;
a first frequency mixer configured to have a first input port through which one of the two signals outputted through the signal distributor is inputted and a second input port connected to an RF signal;
a second frequency mixer configured to have a first input port through which one of the two signals outputted through the signal distributor and a second input port is connected to a termination signal; and
a combiner configured to combine signals respectively outputted from the first and second frequency mixers;
wherein second harmonics respectively outputted from the first and second frequency mixers have a phase difference of 180 degrees.

2. The frequency mixing apparatus of claim 1, wherein the signal distributor is a 90-degree hybrid for dividing the signal generated from the local oscillator into two signals having a phase difference of 90 degrees and outputting the two signals.

3. The frequency mixing apparatus of claim 1, wherein the second input port of the second frequency mixer is connected to a 500 termination signal.

4. The frequency mixing apparatus of claim 1, wherein the first and second frequency mixers are mixers having the same characteristic.

5. The frequency mixing apparatus of claim 1, wherein the combiner removes the second harmonics respectively outputted from the first and second frequency mixers by offsetting the second harmonics from each other in a signal combining process.

6. The frequency mixing apparatus of claim 1, wherein the combiner is a combiner having a zero-degree phase difference.

7. The frequency mixing apparatus of claim 1, wherein the signal inputted through each of the first input ports of the first and second frequency mixers is a signal having a frequency band of 9.8 GHz, and the RF signal inputted through the second input port of the first frequency mixer is a signal having a frequency band of 29.6 to 30 GHz.

* * * * *